(12) United States Patent
Kim et al.

(10) Patent No.: US 10,970,520 B1
(45) Date of Patent: Apr. 6, 2021

(54) APPARATUS AND METHOD FOR IMAGE ANALYSIS USING VIRTUAL THREE-DIMENSIONAL DEEP NEURAL NETWORK

(71) Applicant: JLK INSPECTION, Cheongju-si (KR)

(72) Inventors: Dongmin Kim, Gumi-si (KR); Jonghwan Back, Ulsan (KR); Myung Jae Lee, Seoul (KR); Jisoo Son, Incheon (KR); Shin Uk Kang, Seoul (KR); Tae Won Kim, Suwon-si (KR); Dong-Eog Kim, Seoul (KR)

(73) Assignee: JLK INSPECTION, Cheongju-si (KR)

( * ) Notice: Subject to any disclaimer, the term of this patent is extended or adjusted under 35 U.S.C. 154(b) by 69 days.

(21) Appl. No.: 16/496,960

(22) PCT Filed: Mar. 23, 2018

(86) PCT No.: PCT/KR2018/003404
§ 371 (c)(1),
(2) Date: Sep. 24, 2019

(87) PCT Pub. No.: WO2018/174623
PCT Pub. Date: Sep. 27, 2018

(30) Foreign Application Priority Data

Mar. 24, 2017 (KR) .......................... 10-2017-0037958

(51) Int. Cl.
*G06K 9/00* (2006.01)
*G06N 3/04* (2006.01)
(Continued)

(52) U.S. Cl.
CPC .......... *G06K 9/00201* (2013.01); *G06N 3/04* (2013.01); *G06N 3/08* (2013.01); *G06T 15/205* (2013.01)

(58) Field of Classification Search
CPC .......... G06K 9/00201; G06K 9/00986; G06K 9/4628; G06K 9/6256; G06K 9/66;
(Continued)

(56) References Cited

U.S. PATENT DOCUMENTS 8,866,845 B2 * 10/2014 Leung .................... G06K 9/469
345/633
9,836,820 B2 * 12/2017 Tuzel .................... G06T 3/4046
(Continued)

FOREIGN PATENT DOCUMENTS

JP   2000-105838 A    4/2000
JP   2000-293704 A    10/2000
(Continued)

OTHER PUBLICATIONS

International Search Report for PCT/KR2018/003404 dated Jul. 19, 2018 from Korean Intellectual Property Office.
(Continued)

*Primary Examiner* — Michael S Osinski
(74) *Attorney, Agent, or Firm* — Revolution IP, PLLC (57) ABSTRACT

An apparatus for image analysis includes: an image acquisition unit for stacking a plurality of two-dimensional image data in a predetermined order; a three-dimensional image generation unit for generating a plurality of three-dimensional data on the basis of different types of multiple items of information for the plurality of two-dimensional image data in a stacked form from the image acquisition unit; and a deep learning algorithm analysis unit for applying a two-dimensional convolutional neural network to each of the plurality of three-dimensional data from the three-dimensional image generation unit, and combining results of applying the two-dimensional convolutional neural network to the plurality of three-dimensional data.

7 Claims, 5 Drawing Sheets

(51) Int. Cl.
*G06T 15/20* (2011.01)
*G06N 3/08* (2006.01)

(58) Field of Classification Search
CPC .............. G06K 9/00208; G06K 9/6274; G06T 15/205; G06T 2207/20084; G06T 2207/20081; G06T 2207/10004; G06T 2207/04; G06T 2207/08; G06T 7/11; G06T 7/174; G06T 19/00–20; G06N 3/02–084
See application file for complete search history.

(56) References Cited

U.S. PATENT DOCUMENTS

| | | | |
|---|---|---|---|
| 10,282,918 B2* | 5/2019 | Kiraly | A61B 5/7425 |
| 10,297,070 B1* | 5/2019 | Zhu | G06T 17/00 |
| 10,452,979 B2* | 10/2019 | Park | G06N 3/082 |
| 10,650,289 B2* | 5/2020 | Szegedy | G06N 3/0454 |
| 10,685,421 B1* | 6/2020 | Park | G06K 9/4647 |
| 10,824,862 B2* | 11/2020 | Qi | G06K 9/66 |
| 2015/0125049 A1* | 5/2015 | Taigman | G06T 15/205 382/118 |
| 2015/0178554 A1 | 6/2015 | Kanaujia et al. | |
| 2016/0019861 A1* | 1/2016 | Li | G09G 5/363 345/694 |
| 2016/0148080 A1 | 5/2016 | Yoo et al. | |
| 2017/0316312 A1* | 11/2017 | Goyal | G06F 7/48 |
| 2018/0089888 A1* | 3/2018 | Ondruska | G06T 7/73 |
| 2018/0109776 A1* | 4/2018 | Lee | G06N 20/00 |
| 2019/0026956 A1* | 1/2019 | Gausebeck | G06T 7/579 |
| 2019/0080455 A1* | 3/2019 | Chen | G06K 9/00208 |
| 2019/0130578 A1* | 5/2019 | Gulsun | G06N 3/0445 |
| 2019/0147302 A1* | 5/2019 | Jampani | G06K 9/6277 382/156 |
| 2019/0163955 A1* | 5/2019 | Asif | G06T 7/0012 |
| 2019/0205780 A1* | 7/2019 | Sakaguchi | G06N 3/063 |
| 2019/0206054 A1* | 7/2019 | Mao | G06K 9/627 |
| 2019/0206071 A1* | 7/2019 | Yan | G06T 7/70 |
| 2019/0355093 A1* | 11/2019 | Ye | G06N 3/084 |
| 2019/0365341 A1* | 12/2019 | Chan | G06T 7/0012 |
| 2019/0380278 A1* | 12/2019 | Burden | B25J 9/1005 |
| 2020/0184647 A1* | 6/2020 | Harrison | G06T 7/11 |
| 2020/0242470 A1* | 7/2020 | Menkovski | G06N 20/00 |
| 2020/0320685 A1* | 10/2020 | Anssari Moin | G06T 11/008 |
| 2020/0387698 A1* | 12/2020 | Yi | G06T 7/174 |
| 2021/0004974 A1* | 1/2021 | Guizilini | G06T 7/521 |

FOREIGN PATENT DOCUMENTS

| | | |
|---|---|---|
| JP | 2010-051691 A | 3/2010 |
| KR | 10-2016-0061856 A | 6/2016 |
| KR | 10-2016-0101973 A | 8/2016 |
| KR | 10-2016-0122452 A | 10/2016 |

OTHER PUBLICATIONS

Lee, Beom-Jin et al., "RGB-D-T Face Recognition using Convolutional-Recursive Deep Learning", 2014 Korean Institute of Information Scientists and Engineers the 41st Annual Meeting and Winter Conference, Dec. 2014, pp. 616-618.

Bálint Pál Tóth et al., "Deep Learning and SVM Classification for Plant Recognition in Content-Based Large Scale Image Retrieval", Working Notes of CLEF 2016—Conference and Labs of the Evaluation forum, Sep. 5, 2016, pp. 569-578.

* cited by examiner

(i-1)-th layer　　　　　　i-th layer

APPARATUS AND METHOD FOR IMAGE ANALYSIS USING VIRTUAL THREE-DIMENSIONAL DEEP NEURAL NETWORK

TECHNICAL FIELD

The present invention relates to an image analysis technique using image reconstruction, and more specifically, to an apparatus and a method for image analysis using a virtual three-dimensional deep neural network.

BACKGROUND ART

An artificial neural network (ANN) is one of techniques for implementing machine learning.

Generally, the artificial neural network is configured of an input layer, a hidden layer, and an output layer. Each of the layers is formed of neurons, and neurons of each layer are connected to the output of the neurons of a previous layer. A value obtained by adding a bias to a value calculated through an inner product of the output values of the neurons of the previous layer and connection weights corresponding thereto is put into an activation function, which is generally nonlinear, and an output value of the activation function is transferred to the neurons of the next layer.

Existing machine learning techniques learn a classifier using the information obtained from input data through a feature extraction process designed by a human, whereas artificial neural networks learn feature extraction and a classifier from the beginning to the end (end-to-end learning).

Convolutional neural networks (CNNs) draw much attention, overwhelming the performance of existing machine learning techniques in the field of image recognition. The structure of the convolutional neural network is almost identical to the structure of a general artificial neural network and has a convolutional layer and a pooling layer as additional components.

The structure of a general convolutional neural network has convolutional layers and pooling layers alternating one after another, and an output layer comes last after two or three fully-connected layers. Neurons of the convolutional layers are connected to neurons of a previous layer only in a small area (local connectivity), unlike the artificial neural networks in which the neurons are fully connected to all neurons of the previous layer.

In addition, neurons belonging to a slice such as a feature map have a weighted value and a bias of the same value (parameter sharing). An operation progressed in this manner is a convolution, and a set of applied weight values is referred to as a filter or a kernel. The conventional neural network may effectively extract features from an image, prevent overfitting by reducing the number of parameters, and improve performance of generalization.

The pooling layer is positioned between the convolutional layers to reduce the spatial size of the feature map. This process also reduces the number of parameters and prevents overfitting. The most frequently used form is a max-pooling method of applying 2×2 filters at the intervals of 2. This process reduces the size of the feature map by half in the width and height directions.

Meanwhile, as a conventional technique, there is Korean Laid-opened Patent No. 10-2016-0122452 related to a deep learning framework and an image recognition method for image recognition based on visual contents (disclosed on Oct. 24, 2016). However, this technique provides a framework applying a basic deep learning model, which is somewhat different from constructing a model of a particular structure.

DISCLOSURE OF INVENTION

Technical Problem

Therefore, the present invention has been made in view of the above problems, and it is an object of the present invention to provide an apparatus and a method for image analysis, which can easily analyze three-dimensional image data in a deep neural network by reconstructing two-dimensional images into three-dimensional data in a three-dimensional space, generating other three-dimensional data by rotating the reconstructed three-dimensional data, applying a two-dimensional convolutional neural network to each of the generated three-dimensional data, and combining results of applying the two-dimensional convolutional neural network.

Technical Solution

To accomplish the above object, according to one aspect of the present invention, there is provided an image analysis apparatus using a virtual three-dimensional deep neural network, the apparatus comprising: an image acquisition unit for stacking a plurality of two-dimensional image data in a predetermined order; a three-dimensional image generation unit for generating a plurality of three-dimensional data on the basis of a plurality of information of different forms on the plurality of two-dimensional image data of a stacked form from the image acquisition unit; and a deep learning algorithm analysis unit for applying a two-dimensional convolutional neural network to each of the plurality of three-dimensional data received from the three-dimensional image generation unit, and combining results of applying the two-dimensional convolutional neural network to the plurality of three-dimensional data.

In an embodiment, the three-dimensional image generation unit may perform a zero-mean or unit-variance operation on each of the plurality of two-dimensional image data before generating the plurality of three-dimensional data.

In an embodiment, the plurality of information of different forms may include a pattern corresponding to a change of movement or shape according to a time or a position of the stacked two-dimensional image data, or recognition information of the pattern.

In an embodiment, the deep learning algorithm analysis unit may combine the results of applying the two-dimensional convolutional neural network to the plurality of three-dimensional data, on any one among a convolutional layer, a fully-connected layer, an output layer, and a decision level fusion which calculates an average of final results.

According to another aspect of the present invention, there is provided an image analysis method using a virtual three-dimensional deep neural network, the method comprising the steps of: stacking a plurality of two-dimensional image data in a predetermined order, by an image acquisition unit; generating a plurality of three-dimensional data on the basis of a plurality of information of different forms on the plurality of two-dimensional image data of a stacked form, by a three-dimensional image generation unit; and applying a two-dimensional convolutional neural network to each of the plurality of three-dimensional data, and combining results of applying the two-dimensional convolutional neural network to the plurality of three-dimensional data, by a deep learning algorithm analysis unit.

In an embodiment, the generating step may perform a zero-mean or unit-variance operation on each of the plurality of two-dimensional image data before generating the plurality of three-dimensional data.

In an embodiment, the combining step may combine the results of applying the two-dimensional convolutional neural network to the plurality of three-dimensional data, on any one among a convolutional layer, a fully-connected layer, an output layer, and a decision level fusion which calculates an average of final results.

According to yet another aspect of the present invention, there is provided an image analysis apparatus using a virtual three-dimensional deep neural network, the apparatus comprising: an image acquisition unit for stacking two-dimensional images in order of a photographing position or time; a three-dimensional image generation unit for generating a first three-dimensional image data using the two-dimensional images received from the image acquisition unit, and generating a second three-dimensional image data from the first three-dimensional image data by rotating an axis representing the photographing position or time to be overlapped with either of the other two axes; and a deep learning algorithm analysis unit for applying a two-dimensional convolutional neural network to each of the plurality of three-dimensional data received from the three-dimensional image generation unit, and combining results of applying the two-dimensional convolutional neural network to each three-dimensional data.

In an embodiment, the three-dimensional image generation unit may generate additional three-dimensional data on the basis of other two-dimensional images obtained by rotating the two-dimensional images obtained by the difference between the frames of the two-dimensional image or through optical flow.

According to another aspect of the present invention, there is provided an image analysis method using a virtual three-dimensional deep neural network, the method comprising the steps of: stacking two-dimensional images in order of a photographing position or time, by an image acquisition unit; generating a first three-dimensional image data using the two-dimensional images received from the image acquisition unit, and generating a second three-dimensional image data from the first three-dimensional image data by rotating an axis representing the photographing position or time to be overlapped with either of the other two axes, by a three-dimensional image generation unit; and applying a two-dimensional convolutional neural network to each of the plurality of three-dimensional data received from the three-dimensional image generation unit, and combining results of applying the two-dimensional convolutional neural network to each three-dimensional data, by a deep learning algorithm analysis unit.

In an embodiment, the generating step may generate additional three-dimensional data on the basis of other two-dimensional images obtained by rotating the two-dimensional images obtained by the difference between the frames of the two-dimensional image or through optical flow.

Advantageous Effects

According to the present invention, there is an advantage of more effectively learning three-dimensional data and analyzing images using a two-dimensional convolutional neural network having a small number of parameters compared with a general three-dimensional convolutional neural network method.

In addition, according to the present invention, it is possible to provide a new image analysis model which can perform effective learning and image analysis on three-dimensional image data, while solving the problem of a three-dimensional convolutional neural network model occupying a lot of memory since the number of parameters is large, taking a long time in learning, and having a long calculation time when using a learned model.

BEST MODE FOR CARRYING OUT THE INVENTION

Hereinafter, the preferred embodiment of the present invention will be described in detail with reference to the accompanying drawings. In describing the present invention, elements having like functions will be denoted by like reference numerals and duplicate descriptions on the same element thereon will be omitted to facilitate overall understanding.

Figure 1:
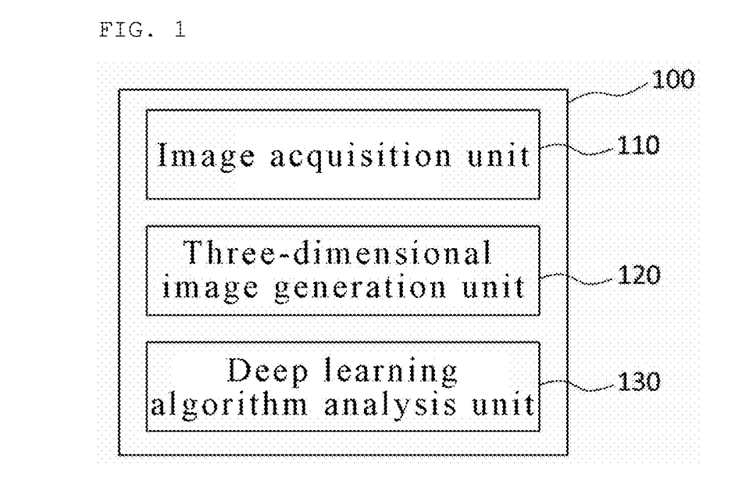
FIG. 1 is a block diagram showing an image analysis apparatus using a virtual three-dimensional deep neural network according to an embodiment of the present invention.

FIG. 1 is a block diagram showing an image analysis apparatus using a virtual three-dimensional deep neural network according to an embodiment of the present invention.

Referring to FIG. 1, an image analysis apparatus 100 according to this embodiment includes an image acquisition unit 110, a three-dimensional image generation unit 120, and a deep learning algorithm analysis unit 130.

The image acquisition unit 110 prepares two-dimensional images stacked in order of a photographing angle or time of the two-dimensional images. The image acquisition unit 110 may be connected to a camera, a control unit, a communication unit and the like.

The three-dimensional image generation unit 120 generates a plurality of three-dimensional data using the two-dimensional images received from the image acquisition unit 110. As a simple example, the three-dimensional image generation unit 120 may convert the two-dimensional images into a first three-dimensional data by stacking the two-dimensional images, and reconstruct the three-dimensional data into a plurality of pieces to generate a second three-dimensional data by rotating the converted first three-dimensional data at a predetermined angle in a three-dimensional space, preferably, rotating any one axis among three axes (x, y, z) to the position of another axis in a three-dimensional space.

This shows that a plurality of three-dimensional data of different forms may be obtained from a plurality of two-dimensional image data stacked on the basis of a predetermined criterion, e.g., along the time axis, according to relative changes in time or position of the plurality of two-dimensional image data. That is, in this embodiment, a plurality of three-dimensional data may be obtained by stacking two-dimensional image data and performing a plurality of operations on the basis of change in time or position of the stacked two-dimensional image data. The three-dimensional data may include three-dimensional image data.

In addition, for example, two-dimensional image data including information on a moving image such as a cell image may have a form in which the morphology and position may change, i.e., a state capable of tracking, in each of the two-dimensional image data. Here, when outer lines are considered, an image recognition apparatus may extract a difference, such as a change in the outer lines or the positions, from the two-dimensional image data according to position or time, and when the two-dimensional image data are converted into three-dimensional data, the image recognition apparatus may recognize a pattern corresponding to a change in movement or shape on the basis of the extracted information. The image recognition apparatus may perform the pattern recognition using a volumemetry or the like.

In other words, if it is assumed that the two-dimensional image data are stacked along the time axis (Z) direction on the X-Y plane, the stacked two-dimensional image data have a form of three-dimensional data. Here, there is a difference when seeing the stacked two-dimensional image data from the top and from the side, and for example, when the stacked two-dimensional image data are seen from the top, difference in the morphology may be recognized as the main difference, and when the stacked two-dimensional image data are seen from the side, the difference may be recognized as a change in the position according to the difference in time. Like this, in this embodiment, a plurality of data, which is recognized as a different form of the stacked two-dimensional image data, i.e., a plurality of virtual three-dimensional data, are acquired and used.

The deep learning algorithm analysis unit 130 analyzes a three-dimensional image by applying a two-dimensional convolutional neural network (CNN) to each of the plurality of reconstructed three-dimensional data and combining the results of applying the two-dimensional convolutional neural network to each three-dimensional data.

Like this, in this embodiment, a three-dimensional image is analyzed by stacking two-dimensional image data and learning different forms of information on the stacked two-dimensional image data using a two-dimensional convolutional neural network.

Although the components 110 to 130 described above may be configured in hardware, it is not limited thereto. It may be implemented such that the components of the image analysis apparatus 100 are stored in a storage device such as a memory or the like in the form of a software module, and a processor connected to the storage device effectively learns and analyzes three-dimensional image data on the basis of a virtual three-dimensional deep neural network by executing the software module.

Hereinafter, an image analysis apparatus using a virtual three-dimensional deep neural network will be described in detail.

Figure 2:
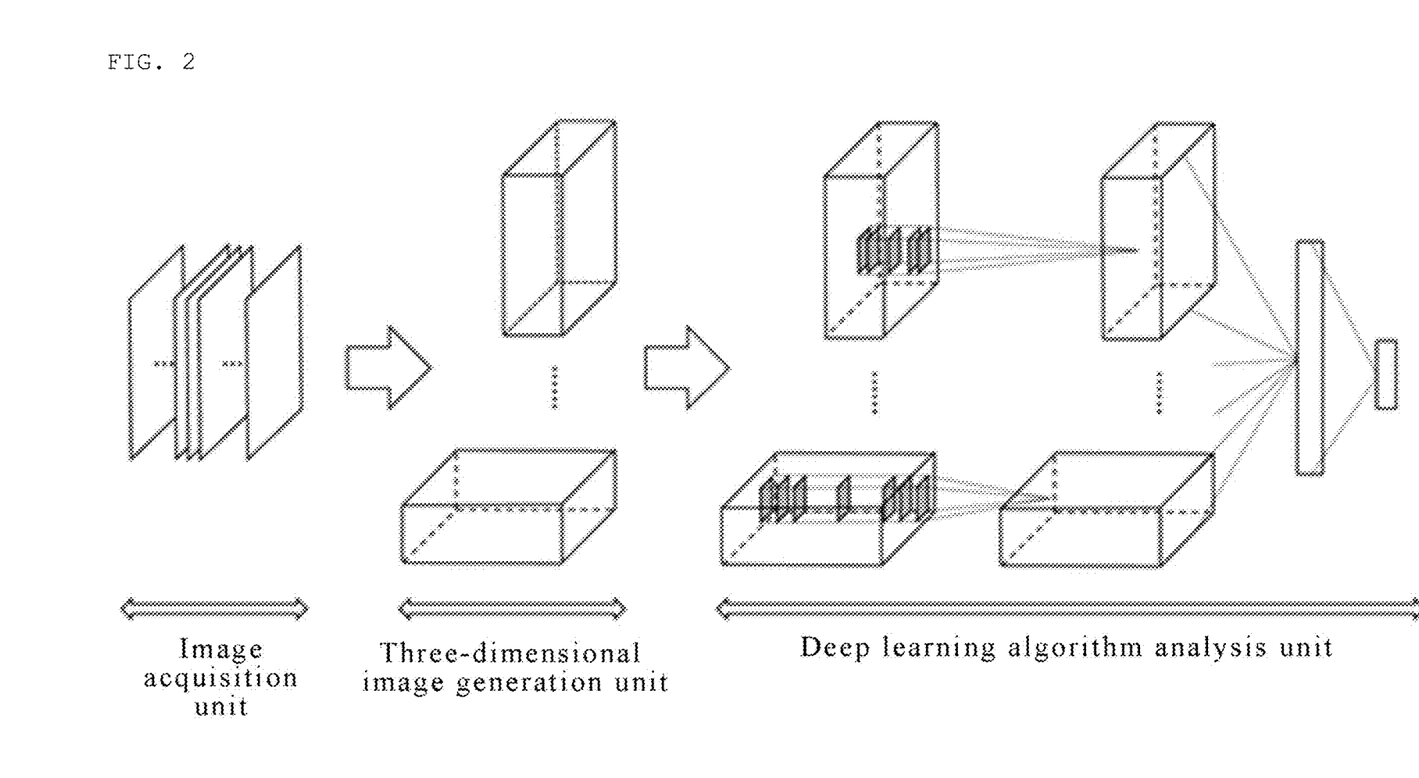
FIG. 2 is an exemplary view schematically showing the operating principle of the image analysis apparatus of FIG. 1.

FIG. 2 is an exemplary view schematically showing the operating principle of the image analysis apparatus of FIG. 1.

Referring to FIG. 2, the image acquisition unit may stack two-dimensional images received or acquired from the outside or stored in and read from a memory or the like installed in the outside or inside of the image analysis apparatus, according to a photographing position or time.

The three-dimensional image generation unit generates a plurality of three-dimensional data using the two-dimensional images received from the image acquisition unit. The three-dimensional data may include three-dimensional image data.

The three-dimensional image generation unit may generate three-dimensional image data by stacking a plurality of two-dimensional images in order of photographing position or time. The three-dimensional image generation unit may generate additional three-dimensional data by rotating the generated three-dimensional image data at a predetermined angle.

For example, when the analysis in performed on the three-dimensional image data in three directions orthogonal to each other, a plurality of three-dimensional image data can be generated through the process described below. That is, if it is assumed that two axes of a two-dimensional image are x and y and an axis representing a photographing position or time of the two-dimensional images is z, it is possible to use a three-dimensional data Dxyz (a first three-dimensional data) generated by stacking the two-dimensional images in the Z-axis order, and a three-dimensional data Dyzx and a three-dimensional data Dzxy generated by rotating the Dxyz in two different axis directions.

Of course, the process may be performed only in two directions among the three directions according to memory size, calculation speed or targeting performance of a final model.

In addition, the three-dimensional image generation unit may additionally generate and use yet another three-dimensional data in addition to the plurality of three-dimensional data described above. That is, the three-dimensional image generation unit may generate a plurality of three-dimensional images by applying the method described above to the yet another image obtained from the original two-dimensional images through a calculation prepared in advance. For example, a plurality of three-dimensional images may be generated through the method described above after performing normalization on each of the two-dimensional images to have zero-mean and unit-variance.

In still another implementation, in the case of a video, the three-dimensional image generation unit may generate images obtained by a difference between frames or through a calculation of optical flow, and additional three-dimensional images by rotating the images.

The deep learning algorithm analysis unit may generate a plurality of two-dimensional data sets by dividing and projecting each of the plurality of three-dimensional data received from the three-dimensional image generation unit at predetermined intervals as needed. The plurality of two-dimensional data sets may be included in the three-dimensional data.

The deep learning algorithm analysis unit may obtain an image analysis result through a process of applying a two-dimensional convolutional neural network to each of the plurality of three-dimensional data received from the three-dimensional image generation unit, and combining the results of applying the two-dimensional convolutional neural network.

The deep learning algorithm analysis unit may combine the two-dimensional convolutional neural networks on a convolutional layer, a fully-connected layer, an output layer, or a decision level fusion which calculates an average of final results.

Figure 3:
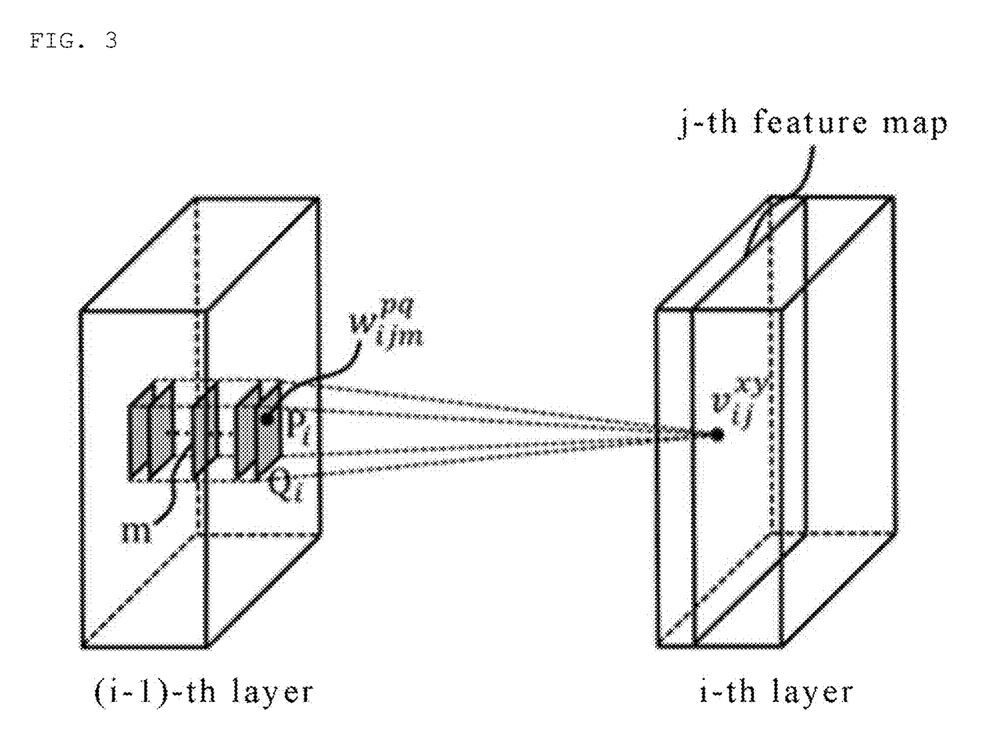
FIG. 3 is an exemplary view illustrating the basic operating principle of a two-dimensional convolutional neural network that can be employed in the image analysis apparatus of FIG. 1.
Figure 4:
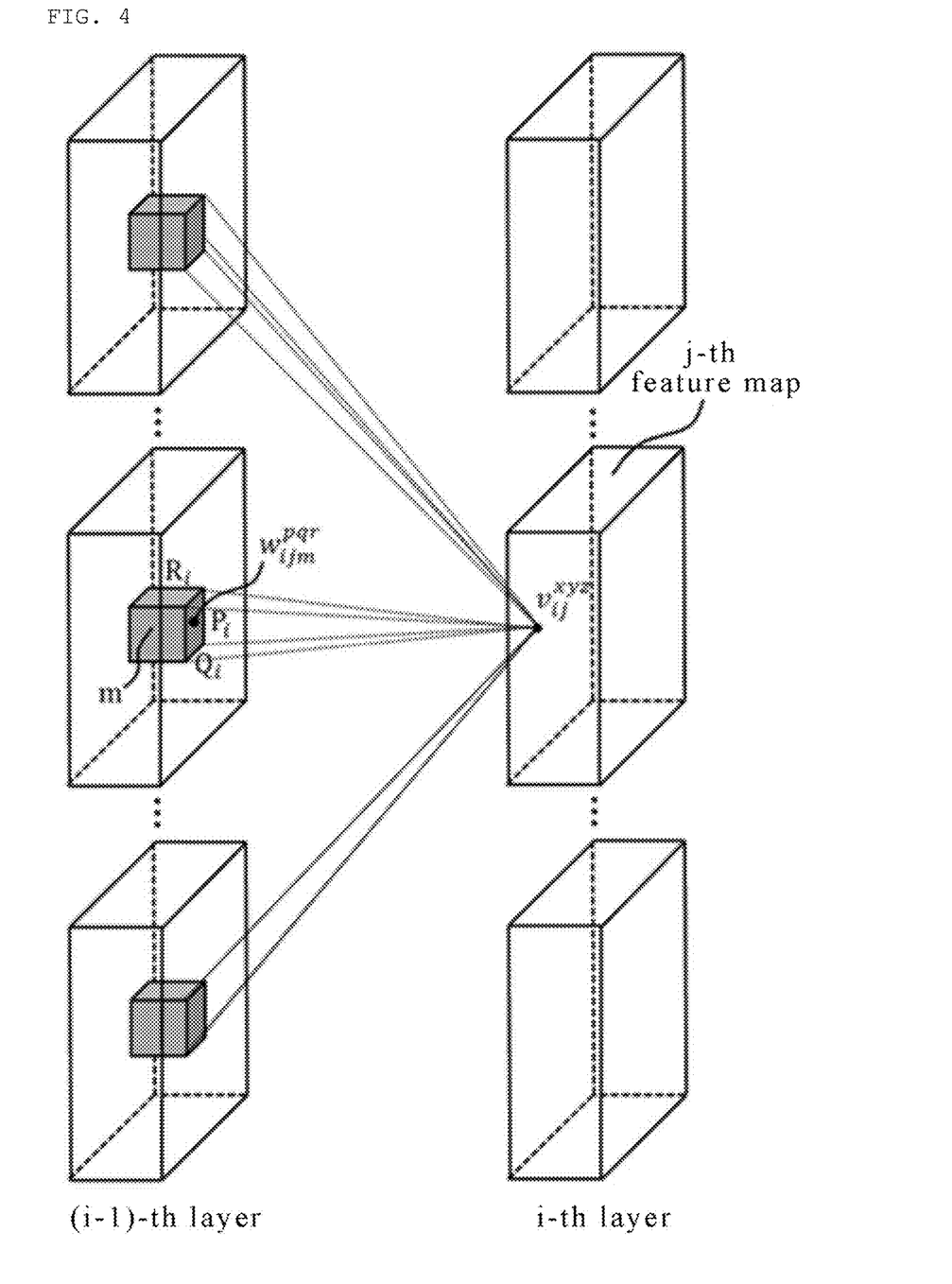
FIG. 4 is an exemplary view illustrating the operating principle of a three-dimensional convolutional neural network according to a comparative example.

FIG. 3 is an exemplary view illustrating the operating principle of a two-dimensional convolutional neural network that can be employed in the image analysis apparatus of FIG. 1. FIG. 4 is an exemplary view illustrating the operating principle of a three-dimensional convolutional neural network according to a comparative example.

First, referring to FIG. 3, a convolution calculation structure of a two-dimensional convolutional neural network is shown. The convolution calculation structure of a two-dimensional convolutional neural network may be expressed as shown in Mathematical expression 1.

$$v_{ij}^{xy} = f\left(b_{ij} + \sum_{m}\sum_{p=0}^{P_i-1}\sum_{q=0}^{Q_i-1} w_{ijm}^{pq} v_{(i-1)m}^{(v+p)(y+q)}\right)$$ [Mathematical expression 1]

In the Mathematical expression 1, $v_{ij}^{xy}$ denotes a value at position (x, y) in the j-th feature map of the i-th layer, f(•) denotes an activation function, $b_{ij}$ denotes a bias to a corresponding feature map, m denotes the index of the feature map of the (i-1)-th layer, $w_{ijm}^{pq}$ denotes a value at position (p, q) of a kernel or a filter applied to the m-th feature map, and $P_i$ and $Q_i$ denote vertical and horizontal sizes of each kernel.

The two-dimensional convolutional neural network described above shows outstanding performance in recognizing an image. However, since the convolution that is performed calculates only two-dimensional spatial features, when only the two-dimensional convolutional neural network is used, information in the depth or time direction in a three-dimensional image having several two-dimensional images collected may not be learned.

Although a three-dimensional convolutional neural network model is used instead to overcome the problems described above, since a general three-dimensional convolutional neural network learns three-dimensional filters to analyze three-dimensional images, a lot of memory is occupied and a long time is taken to learn due to the large number of parameters (see Mathematical expression 2). Therefore, in this embodiment, a convolution calculation structure using a two-dimensional convolutional neural network and a convolution calculation structure using a three-dimensional convolutional neural network are combined and used in a new method.

The convolution calculation structure of a three-dimensional convolutional neural network combined with the convolution calculation structure of a two-dimensional convolutional neural network may be shown as shown in FIG. 4 or expressed as shown in Mathematical expression 2 described below.

$$v_{ij}^{xyz} = $$ [Mathematical expression 2]
$$f\left(b_{ij} + \sum_{m}\sum_{p=0}^{P_i-1}\sum_{q=0}^{Q_i-1}\sum_{r=0}^{R_i-1} w_{ijm}^{pq} v_{(i-1)m}^{(v+p)(y+q)(z+r)}\right)$$

In the Mathematical expression 2, $v_{ij}^{xyz}$ denotes a value at position (x, y, z) in the j-th feature map of the i-th layer, f(•) denotes an activation function, $b_{ij}$ denotes a bias to a corresponding feature map, m denotes the index of the feature map of the (i-1)-th layer, $w_{ijm}^{pqr}$ denotes a value at position (p, q, r) of a kernel or a filter applied to the m-th feature map, and $P_i$, $Q_i$ and $R_i$ denote vertical, horizontal and depth (temporal) sizes of each kernel.

Like this, the existing techniques using only the three-dimensional convolutional neural network model described above occupy a lot of memory and take a long time in learning since basically the number of parameters is very large, and furthermore, the calculation time is long when the learned model is used. Accordingly, in this embodiment, it is possible to efficiently learn three-dimensional image data and analyze images using a two-dimensional convolutional neural network having fewer parameters than the three-dimensional convolutional neural network.

That is, the deep learning algorithm analysis unit may derive an image analysis result using a 'virtual three-dimensional deep neural network' including the process of applying a two-dimensional convolutional neural network to each of a plurality of two-dimensional data sets (a plurality of three-dimensional data) received from the three-dimensional image generation unit and combining the results of applying the two-dimensional convolutional neural network.

Figure 5:
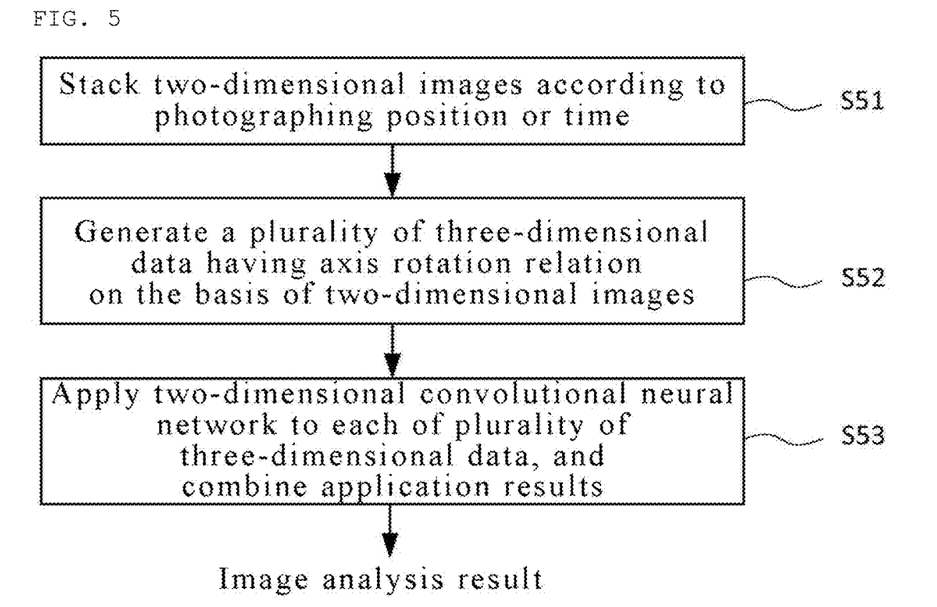
FIG. 5 is a flowchart illustrating an image analysis method using a virtual three-dimensional deep neural network according to another embodiment of the present invention.

FIG. 5 is a flowchart illustrating an image analysis method using a virtual three-dimensional deep neural network according to another embodiment of the present invention.

Referring to FIG. 5, an image analysis method using a virtual three-dimensional deep neural network according to this embodiment includes the steps of stacking two-dimensional images of a specific group according to a photographing position or time by the image acquisition unit of the image analysis apparatus (step S51), generating a three-dimensional image (a first three-dimensional data) using the two-dimensional images and generating a second three-dimensional data by rotating the first three-dimensional data (step S52), and applying a two-dimensional convolutional neural network to each of a plurality of three-dimensional images (the first and second three-dimensional data) and combining the results of applying the two-dimensional convolutional neural network to each three-dimensional image (step S53).

The image analysis method using a virtual three-dimensional deep neural network according to this embodiment may be applied to learn three-dimensional data and analyze images more effectively using a two-dimensional convolutional neural network having a small number of parameters compared with a general three-dimensional convolutional neural network method. This method may be named as a method using a 'virtual three-dimensional deep neural network'.

Figure 6:
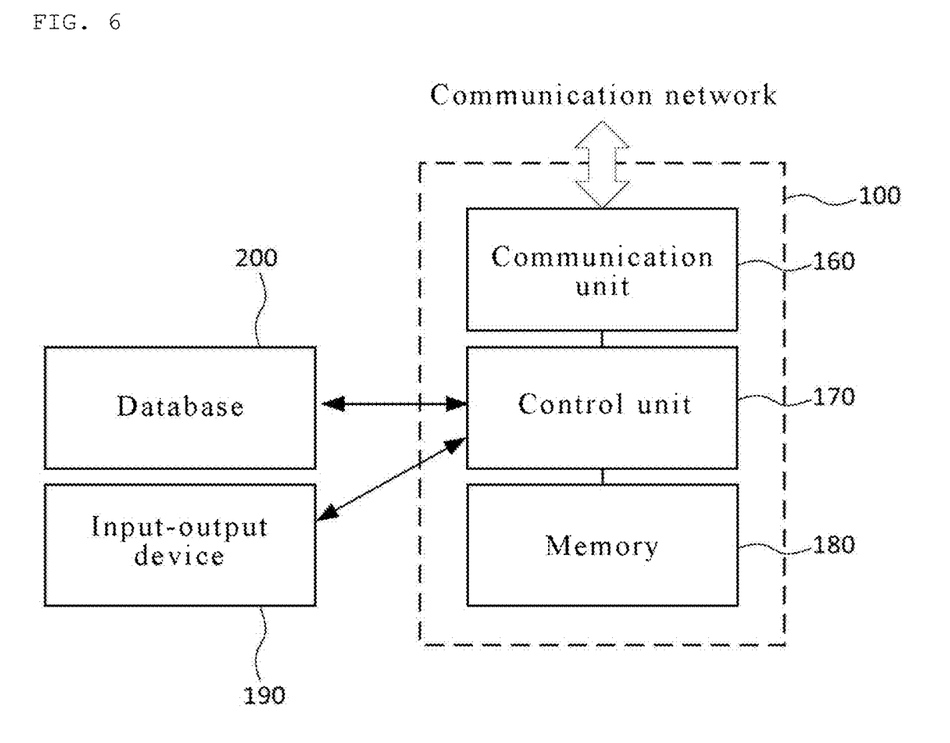
FIG. 6 is a block diagram showing an image analysis apparatus using a virtual three-dimensional deep neural network according to yet another embodiment of the present invention.

FIG. 6 is a block diagram showing an image analysis apparatus using a virtual three-dimensional deep neural network according to yet another embodiment of the present invention.

Referring to FIG. 6, the image analysis apparatus 100 according to this embodiment may include a communication unit 160, a control unit 170, and a memory 180. The image analysis apparatus 100 may be implemented to include a controller or a computing device. The image analysis apparatus 100 may be connected to an input-output device 190 for processing data or signals according to an input from a user, a manager, a control terminal or the like and outputting a result of the processing. In addition, the image analysis apparatus 100 may be connected to a database system 200 provided with a database. The database may store at least any one among identification information, access information and authentication information of a device which provides an image to be analyzed.

Although the input-output device 190 and the database system 200 are shown in this embodiment in a form that is not included in the image analysis apparatus 100, the present invention is not limited to the configuration and may be implemented to further include at least any one or more among the input-output device 190 and the database system 200 according to implementation.

The communication unit 160 connects the image analysis apparatus 100 to a communication network. The communication unit 160 may receive images, or information or a signal related to image analysis from a user terminal, a server, a manager terminal and the like accessing through the network.

The communication unit 160 may include one or more wired and/or wireless communication subsystems supporting one or more communication protocols. A wired communication subsystem may include a public switched telephone network (PSTN), an asymmetric digital subscriber line (ADSL) or very high-data rate digital subscriber Line (VDSL) network, a subsystem for PSTN emulation service (PES), Internet protocol (IP) multimedia subsystem (IMS) and the like. A wireless communication subsystem may include a radio frequency (RF) receiver, an RF transmitter, an RF transceiver, an optical (e.g., infrared) receiver, an optical transmitter, an optical transceiver or a combination of these.

Although a wireless network basically refers to Wi-Fi, it is not limited thereto. In this embodiment, the communication unit 160 may be implemented to support at least one or more selected among various wireless networks, for example, global system for mobile communication (GSM), enhanced data GSM environment (EDGE), code division multiple access (CDMA), W-code division multiple access (W-CDMA), long term evolution (LTE), LET-advanced (LET-A), orthogonal frequency division multiple access (OFDMA), WiMax, wireless fidelity (Wi-Fi), Bluetooth and the like.

The control unit 170 may implement the image analysis method by executing a software module or a program stored in an internal memory or the memory 180. The control unit 170 may be referred to as, for example, a processor and may execute a series of procedures shown in FIG. 5.

The control unit 170 may be implemented as a processor or a microprocessor including at least one or more central processing units (CPUs) or cores. The central processing unit or the core may be provided with a register for storing a command to be processed, an arithmetic logical unit (ALU) in charge of comparison, decision and operation, a control unit for internally controlling the CPU for analysis and execution of the command, and an internal bus for connecting these components. Although the central processing unit or the core may be implemented as a system on chip (SOC) in which a micro control unit (MCU) and peripheral devices (an integrated circuit for external extension devices) are arranged together, it is not limited thereto.

In addition, although the control unit 170 may include one or more data processors, image processors, and codecs, it is not limited thereto. The control unit 170 may be provided with a peripheral device interface and a memory interface. The peripheral device interface may connect the control unit 170 to an input-output system such as the input-output device 190 or other peripheral devices, and the memory interface may connect the control unit 170 to the memory 180.

The memory 180 may store a software module for analyzing images using a virtual three-dimensional deep neural network. The software module may include a first module to a third module performing the steps (S51 to S53) of FIG. 5.

The memory 180 described above may be implemented as semiconductor memory such as non-volatile RAM (NVRAM), dynamic random access memory (DRAM) which is representative volatile memory or the like, a hard disk drive (HDD), an optical storage device, flash memory or the like. In addition, the memory 180 may store an operating system, programs, command sets and the like, in addition to the software module for analyzing images using a virtual three-dimensional deep neural network.

Meanwhile, the image analysis method according to this embodiment may be implemented in the form of a program command that can be executed through various computer means and may be recorded in a computer-readable medium. The computer-readable medium may include program commands, data files, data structures and the like independently or in combination. The program commands recorded in the computer-readable medium may be the ones specially designed and constructed for the present invention or the ones opened to and used by those skilled in computer software.

Examples of the computer-readable medium include hardware devices specially configured to store and execute program commands, such as ROM, RAM, flash memory and the like. Examples of the program commands include a high-level language code that can be executed by a computer using an interpreter or the like, as well as a machine language code such as the ones generated by a compiler. The hardware device described above may be configured to operate by at least one software module to perform the operation of the present invention, and vice versa.

As described above, this embodiment provides a method of constructing a structure of a deep neural network for analyzing three-dimensional image data. The structure of the virtual three-dimensional deep neural network according to this embodiment may be utilized for analysis of three-dimensional image data, such as diagnosing a disease from an inputted medical image, finding location of a lesion, or recognizing behaviors of a person from a video.

Although it has been described with reference to the preferred embodiments of the present invention, those skilled in the art may understand that the present invention can be diversely changed and modified without departing from the scope and spirit of the present invention disclosed in the claims described below.

The invention claimed is:
1. An image analysis apparatus using a virtual three-dimensional deep neural network, the apparatus comprising:
    an image acquisition unit for stacking a plurality of two-dimensional image data in a predetermined order;
    a three-dimensional image generation unit for generating a plurality of three-dimensional data on the basis of a plurality of information of different forms on the plurality of two-dimensional image data of a stacked form received from the image acquisition unit; and
    a deep learning algorithm analysis unit for applying a two-dimensional convolutional neural network to each of the plurality of three-dimensional data received from the three-dimensional image generation unit, and com- bining results of applying the two-dimensional convolutional neural network to the plurality of three-dimensional data.

2. The apparatus according to claim 1, wherein the three-dimensional image generation unit performs a zero-mean or unit-variance operation on each of the plurality of two-dimensional image data before generating the plurality of three-dimensional data.

3. The apparatus according to claim 1, wherein the plurality of information of different forms includes a pattern corresponding to a change of movement or shape according to a time or a position of the stacked two-dimensional image data, or a recognition information of the pattern.

4. The apparatus according to claim 1, wherein the deep learning algorithm analysis unit combines the results of applying the two-dimensional convolutional neural network to the plurality of three-dimensional data, on any one among a convolutional layer, a fully-connected layer, an output layer, and a decision level fusion which calculates an average of final results.

5. An image analysis method using a virtual three-dimensional deep neural network, the method comprising the steps of:

stacking a plurality of two-dimensional image data in a predetermined order, by an image acquisition unit;

generating a plurality of three-dimensional data on the basis of a plurality of information of different forms on the plurality of two-dimensional image data of a stacked form, by a three-dimensional image generation unit; and applying a two-dimensional convolutional neural network to each of the plurality of three-dimensional data, and combining results of applying the two-dimensional convolutional neural network to the plurality of three-dimensional data, by a deep learning algorithm analysis unit.

6. The method according to claim 5, wherein the generating step performs a zero-mean or unit-variance operation on each of the plurality of two-dimensional image data before generating the plurality of three-dimensional data.

7. The method according to claim 5, wherein the combining step combines the results of applying the two-dimensional convolutional neural network to the plurality of three-dimensional data, on any one among a convolutional layer, a fully-connected layer, an output layer, and a decision level fusion which calculates an average of final results.

* * * * *